US012601985B2

US 12,601,985 B2

(12) United States Patent (10) Patent No.: US 12,601,985 B2
Ohtsu et al. (45) Date of Patent: Apr. 14, 2026

(54) METHOD FOR MANUFACTURING TONER

(71) Applicant: CANON KABUSHIKI KAISHA,
Tokyo (JP)

(72) Inventors: Takeshi Ohtsu, Ibaraki (JP); **Junichi
Tamura, Ibaraki (JP); Yosuke Iwasaki**,
Chiba (JP); Ryuji Okamura, Ibaraki
(JP); Daisuke Yamashita, Chiba (JP)

(73) Assignee: Canon Kabushiki Kaisha, Tokyo (JP)

( * ) Notice: Subject to any disclaimer, the term of this
patent is extended or adjusted under 35
U.S.C. 154(b) by 664 days.

(21) Appl. No.: 18/058,209

(22) Filed: Nov. 22, 2022

(65) Prior Publication Data

US 2023/0168597 A1 Jun. 1, 2023

(30) Foreign Application Priority Data

Nov. 29, 2021 (JP) ................................. 2021-192912

(51) Int. Cl.
G03G 9/08 (2006.01)
B29B 13/02 (2006.01)

(52) U.S. Cl.
CPC ......... G03G 9/0815 (2013.01); G03G 9/0819
(2013.01); G03G 9/0827 (2013.01); **B29B
13/021** (2013.01)

(58) Field of Classification Search
CPC .. G03G 9/0815; G03G 9/0819; G03G 9/0827;
B29B 13/021
See application file for complete search history.

(56) References Cited

U.S. PATENT DOCUMENTS

2014/0120468 A1* 5/2014 Mizo et al. .............. G03G 9/08

FOREIGN PATENT DOCUMENTS

JP 2005165072 A 6/2005
JP 2008129522 A 6/2008

OTHER PUBLICATIONS

National Asthma Council Australia web page, Leanne Koster, Feb.
16, 2016 (Year: 2016).*

* cited by examiner

*Primary Examiner* — Peter L Vajda
*Assistant Examiner* — Grant Steven Seiler
(74) *Attorney, Agent, or Firm* — Canon U.S.A., Inc. IP
Division

(57) ABSTRACT

A method for manufacturing a toner including supplying
powder particles containing a binder resin via a plurality of
powder-particle supplying units to a treating chamber, the
treating chamber having a cylindrical inner peripheral sur-
face, heat treating the powder particles in the treating
chamber by supplying hot air into the treating chamber,
wherein a temperature of the hot air supplied into the
treating chamber is 100.0° C. or higher and 200.0° C. or
lower, and adjusting a humidity of the hot air so that a
relative humidity of the hot air supplied into the treating
chamber is 3.0% or more and 80.0% or less.

6 Claims, 5 Drawing Sheets

METHOD FOR MANUFACTURING TONER

BACKGROUND OF THE INVENTION

Field of the Invention

The present disclosure relates to a method for manufacturing a toner used for an image forming method such as an electrophotographic method, an electrostatic recording method, an electrostatic printing method, or a toner-jet-system recording method.

Description of the Related Art

In the image forming method of electrophotography, a toner for developing an electrostatic image is used.

In recent years, in accordance with output materials or output images of a copying machine or a printer having higher image quality and higher definition, performance required for a toner serving as a developing agent has become further severe. The toner is required to have a small particle diameter and a sharp particle size distribution wherein a coarse particle is not included.

Further, media for a copying machine or a printer have to also deal with various materials other than common paper, and an improvement in toner transferability is also required. Consequently, demands for spheronizing the toner have intensified.

However, on the other hand, if the toner is excessively spheronized, cleaning performance is reduced. Therefore, it is also required to control a degree of spheronization of the toner so as to ensure compatibility between the transferability and the cleaning performance.

To address such a demand, as a production method that controls the degree of spheronization, there is a method in which the surface of the toner is melted and spheronized by heat treatment.

In an apparatus for spheronizing a toner by heat treatment, toner is melted by hot air and is spheronized. Therefore, when a balance between the amount of the hot air supplied and the amount of the toner supplied is lost, a toner having a predetermined degree of spheronization is not limited to being obtained, or the apparatus is not limited to be stably operated since a molten toner melt-adheres inside the apparatus due to excessive melting of the toner.

In addition, if the toner is not dispersed in the apparatus, toner particles melted by the hot air may adhere to and unite with each other, the particle diameter may increase, and a toner having predetermined particle diameter and degree of spheronization is not limited to being obtained.

To address these disadvantages, a method for manufacturing a toner in which a toner having a predetermined degree of spheronization while being in a state of a low cohesion degree is obtained by heat-melting the toner in a circulating stream of superheated seam is proposed (Japanese Patent Laid-Open No. 2008-129522). According to the proposal, it is disclosed that the cohesion degree of the toner is reduced, the toner is readily spheronized, the production efficiency is high, and, further, the toner having excellent transferability is obtained.

However, when the toner is heat-treated by this manufacturing method, since the humidity of the superheated steam is high, condensation occurs immediately after contact with a low-temperature substance. The condensation may cause the toner to adhere inside the apparatus and the heated toner may melt-adhere inside the apparatus. In addition, regarding this manufacturing method, the speed of the toner-conveying air is low, the toner is not sufficiently dispersed in the apparatus, united particles are generated, and a spheronized toner having a predetermined particle diameter is not limited to being obtained.

As described above, when the toner is spheronized by heat treatment, to suppress toner melt-adhesion inside the apparatus from occurring, to reduce united particles, and to stably obtain the toner having predetermined particle diameter and degree of spheronization, there is room for improvement in the heat-treatment apparatus and the manufacturing method for the toner.

SUMMARY OF THE INVENTION

The present disclosure suppresses powder particles from uniting with each other and suppresses powder particles from adhering or melt-adhering inside an apparatus so as to improve toner productivity when powder particles containing a binder resin is spheronized by heat treatment.

The present disclosure relates to a method for manufacturing a toner including supplying powder particles containing a binder resin via a plurality of powder-particle supplying units to a treating chamber, the treating chamber having a cylindrical inner peripheral surface, heat treating the powder particles in the treating chamber by supplying hot air into the treating chamber, wherein a temperature of the hot air supplied into the treating chamber is 100.0° C. or higher and 200.0° C. or lower, and adjusting a humidity of the hot air so that a relative humidity of the hot air supplied into the treating chamber is 3.0% or more and 80.0% or less.

Further features of the present disclosure will become apparent from the following description of exemplary embodiments with reference to the attached drawings.

DESCRIPTION OF THE EMBODIMENTS

The present disclosure will be described below in detail with reference to a favorable embodiment.

The present disclosure relates to a method for manufacturing a toner including heat-treating powder particles containing a binder resin by using a heat-treating apparatus, wherein the heat-treating apparatus includes (1) a treating chamber which has a cylindrical inner peripheral surface and in which heat treatment by hot air is performed, (2) a plurality of powder-particle supplying units configured to supply the powder particles to the treating chamber, and (3) a hot-air supplying unit configured to supply the hot air that performs heat treatment into the treating chamber, a humidity-adjusting unit configured to adjust a humidity of a gas supplied to the hot-air supplying unit is connected to the hot-air supplying unit, a temperature of the hot air when supplied into the treating chamber is 100.0° C. or higher and 200.0° C. or lower, and a humidity of the hot air is adjusted by using the humidity-adjusting unit so that a relative humidity when supplied into the treating chamber is set to be 3.0% or more and 80.0% or less.

In the present heat treatment, when the powder particles containing the binder resin are spheronized, the temperature and the humidity of the hot air being adjusted enables powder particles to be suppressed from uniting with each other and enables powder particles to be suppressed from adhering and melt-adhering inside the apparatus so as to improve the productivity of the toner.

A mechanism thereof is conjectured that since the powder particles are heat-treated by the hot air humidified at the humidity in the range according to the present disclosure, the heat treatment is performed in a state in which an electrostatic adhesive power of the powder particles is relaxed, and adhesion between powder particles and adhesion between the powder particles and the apparatus are thereby reduced so as to suppress melt-adhesion of the toner from occurring.

When powder particles unite with each other, since the shape of the toner becomes an irregular shape, a temperature required for obtaining a predetermined circularity increases. In this regard, when a temperature required for obtaining a predetermined circularity increases, melt-adhesion inside the apparatus tends to occur.

Adhesion between powder particles being reduced enables united particles in the toner produced by heat treatment to be reduced and enables the toner having a sharp particle size distribution to be produced. In addition, since adhesion or melt-adhesion of the toner to the apparatus being reduced enables the productivity of the toner to be improved and enables a time period required for stopping and cleaning the apparatus for the purpose of maintenance of the apparatus to be reduced.

The outline of the heat-treating apparatus used in the present disclosure will be described with reference to FIG. 1, FIG. 2, FIG. 3, FIG. 4, and FIG. 5.

Figure 1:
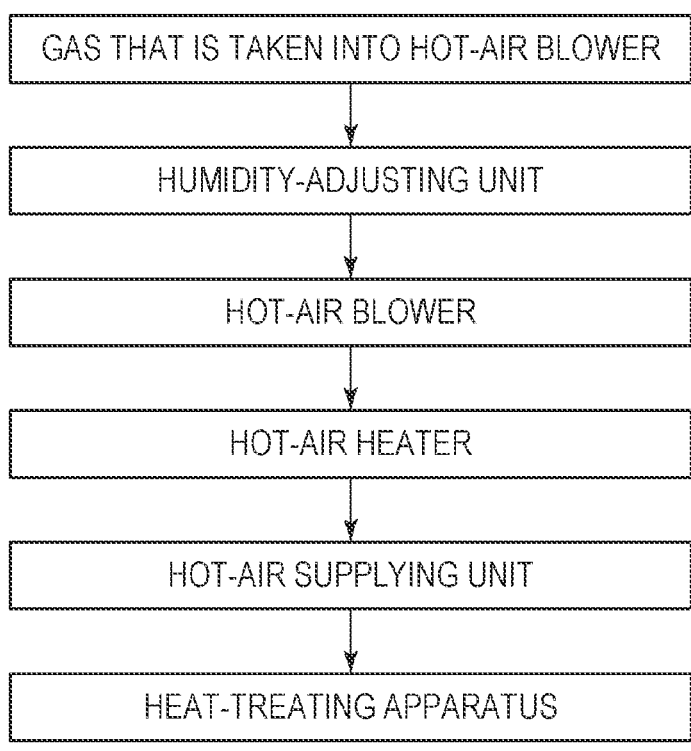
FIG. 1 is a diagram illustrating an example of connection of a heat-treating apparatus, a hot-air supplying unit, and a humidity-adjusting unit.

FIG. 1 is a diagram illustrating an example of connection of a heat-treating apparatus, a hot-air supplying unit, and a humidity-adjusting unit. According to FIG. 1, a gas that is taken into a hot-air blower is taken into a humidity-adjusting unit in which the humidity is adjusted, and the gas is supplied to the hot-air supplying unit through the hot-air blower and a hot-air heater. Regarding the humidity and the temperature of the hot air, the humidity and the temperature immediately after the hot air passes through the hot-air supplying unit are measured. The humidity-adjusting unit has to be followed by the hot-air supplying unit, and the humidity-adjusting unit may be disposed after the hot-air blower in FIG. 1 or may be disposed after the hot-air heater.

There is no particular limitation regarding the humidity-adjusting unit, and a common humidity controller may be used. Examples include a steam type humidifier, a vaporizing type humidifier, a fog type humidifier, and a hybrid humidifier in combination of these. Specific examples include a gas type steam humidifier, an electrothermal steam humidifier, an electrode type steam humidifier, a vaporized fog type humidifier, a vaporized steam type humidifier, a steam vaporizing type humidifier, and a centrifugal humidifier.

Figure 2:
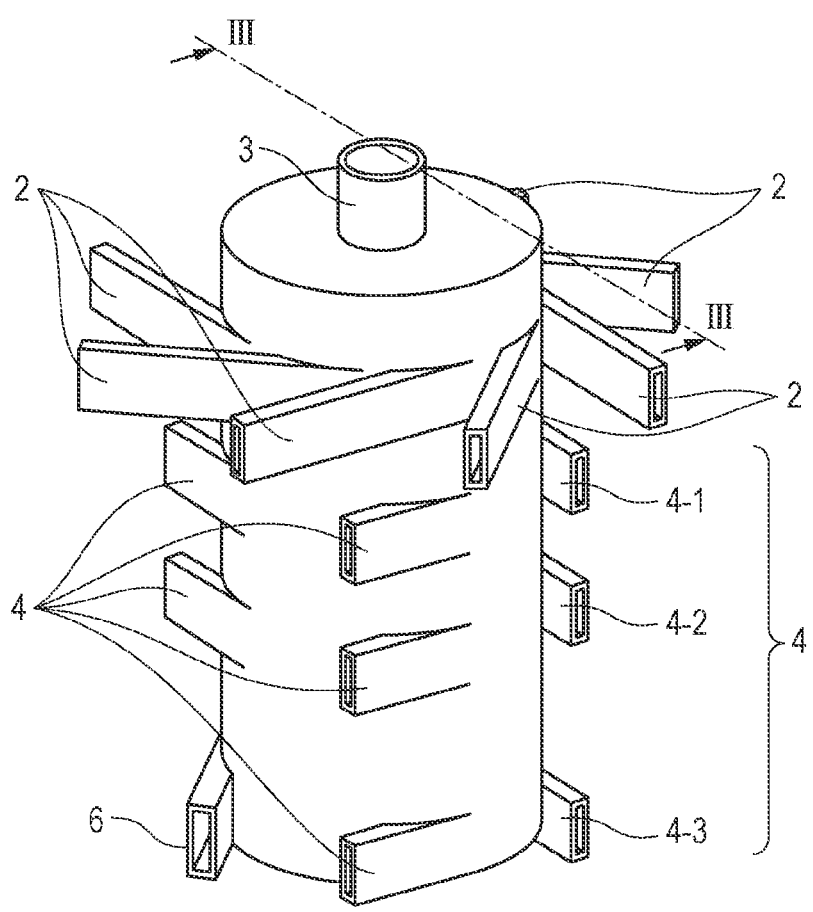
FIG. 2 is a schematic perspective view illustrating an example of the heat-treating apparatus.
Figure 3:
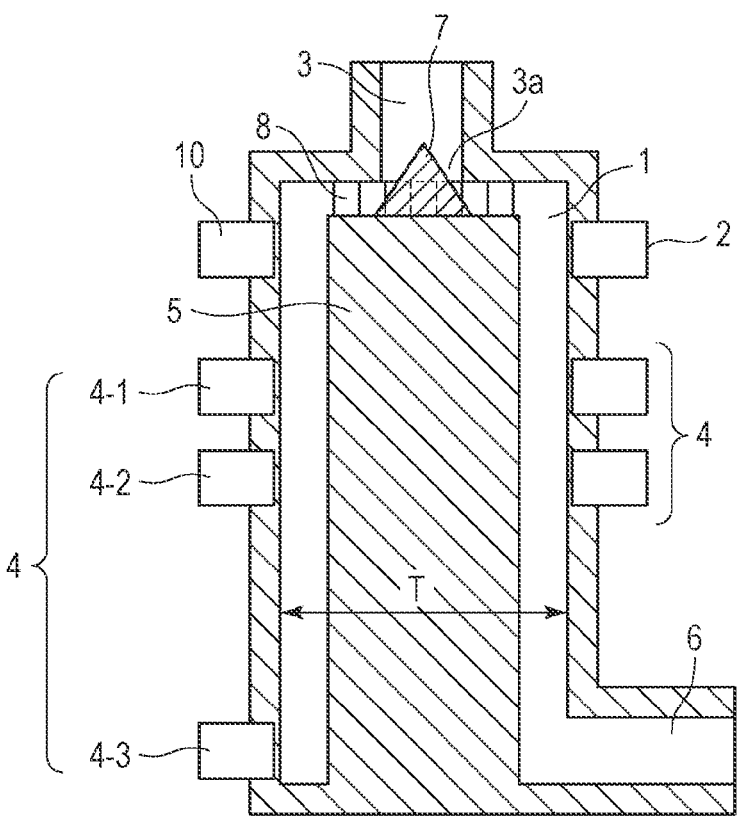
FIG. 3 is a schematic sectional view illustrating a cross section cut along line III-III in FIG. 2.
Figure 4:
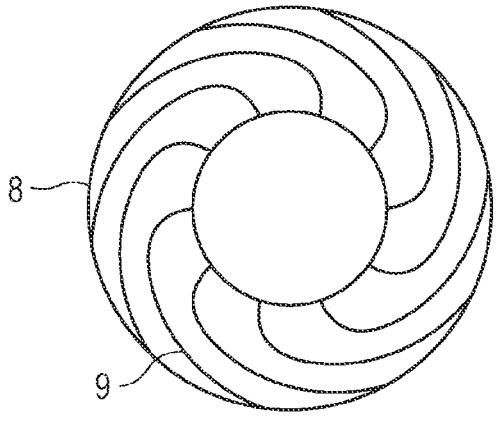
FIG. 4 illustrating a circulating member for spirally circulating hot air used in the heat-treating apparatus.
Figure 5:
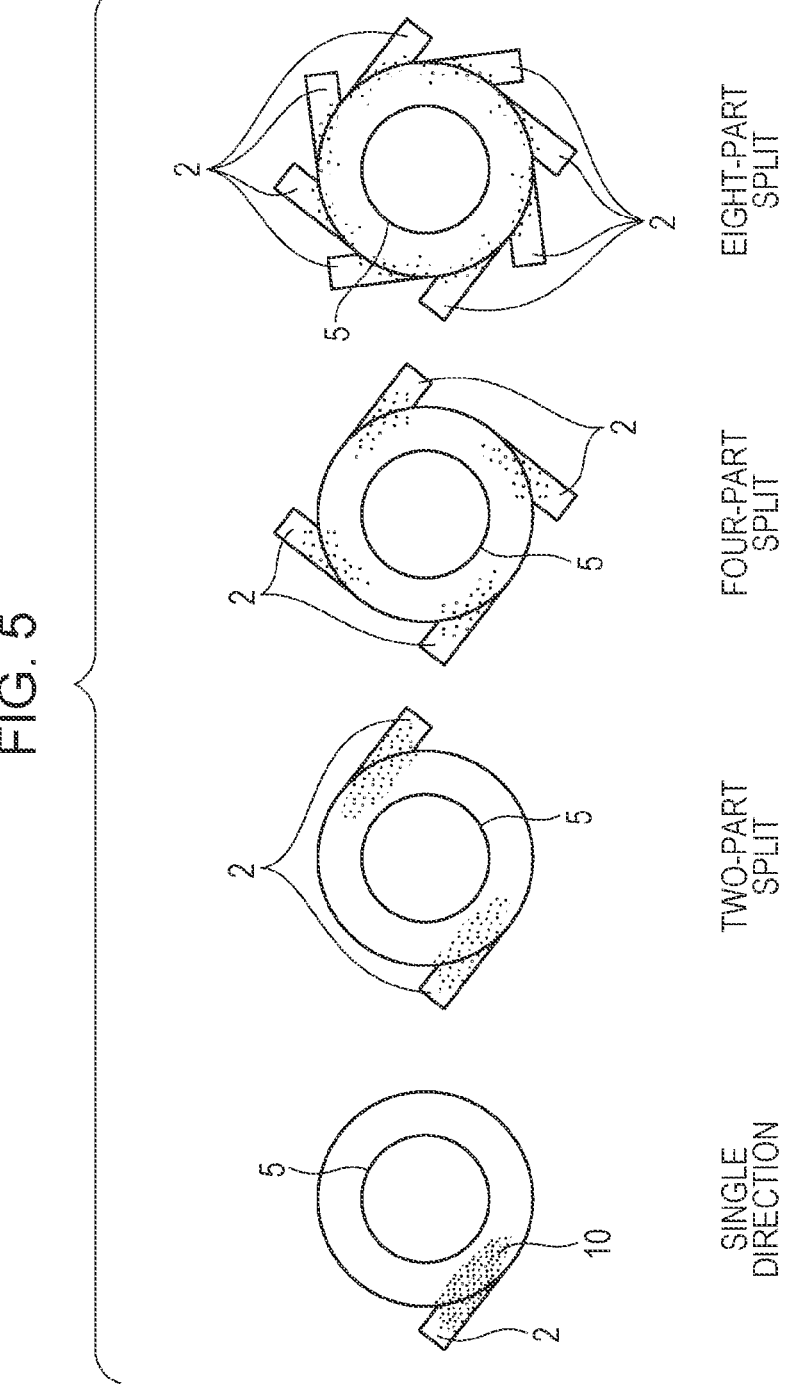
FIG. 5 is a schematic explanatory diagram illustrating a powder density in accordance with the number of split when powders are supplied into a treating chamber.

FIG. 2 is a schematic perspective view illustrating the heat-treating apparatus. FIG. 3 is a schematic sectional view illustrating a cross section cut along line III-III in FIG. 2. FIG. 4 illustrates a circulating member for spirally circulating the hot air, which is used in the heat-treating apparatus. FIG. 5 is a schematic explanatory diagram illustrating a powder density in accordance with the number of split when powders are supplied into a treating chamber.

As illustrated in FIG. 3, the heat-treating apparatus includes a cylindrical treating chamber 1 in which toner powder particles are heat-treated.

In the heat-treating apparatus, the shape of the treating chamber has to be a cylindrical shape.

Further, the interior of the treating chamber can be cooled by using a cooling jacket to prevent melt-adhesion of the powder particles from occurring. Cooling water (favorably an antifreeze such as ethylene glycol) can be introduced into the cooling jacket, and the surface temperature of the cooling jacket can be 40° C. or lower.

In the heat-treating apparatus, powder-particle supplying units 2 and 10 for supplying the powder particles to the treating chamber can be disposed on the outer peripheral portion of the treating chamber. In this regard, the powder particles may be conveyed using the conveying air so as to be supplied to the treating chamber or may be conveyed by suction of a blower. When the conveying air is used, acceleration and conveyance may be configured to be performed by injection air supplied from a high-pressure air-supplying nozzle (not illustrated in the drawing).

The hot air for heat-treating the supplied powder particles is supplied from a hot-air supplying unit 3. Regarding the hot air supplied into the treating chamber, a temperature A (° C.) at an outlet portion of the hot-air supplying unit 3 is 100° C. or higher and 200° C. or lower. The temperature at the outlet portion of the hot-air supplying unit being within the above-described range enables the powder particles to be prevented from melt-adhering and uniting due to the powder particles being excessively heated and enables the powder particles to be subjected to uniform spheronization treatment.

When the temperature (° C.) is lower than 100° C., the powder particles are not limited to being sufficiently spheronized. When the temperature is higher than 200° C., since the treatment temperature is excessively high, melt-adhesion of the powder particles may occur inside the apparatus.

The relationship between the temperature A (° C.) of the hot air and the glass transition temperature Tg (° C.) of the binder resin of the toner can be as described below. When the relationship between the hot-air temperature and the glass transition temperature of the binder resin of the toner is as described below, heat-spheronization of the toner particle is efficiently performed. If the hot-air temperature is lower than the glass transition temperature of the binder resin of the toner, heat-spheronization of the toner particles tends to become difficult.

$$Tg \leq A$$

The relative humidity of the hot air supplied into the treating chamber is adjusted to 3.0% or more and 80.0% or less by the humidity-adjusting unit and is adjusted to further preferably 4.0% or more and 75.0% or less.

When the relative humidity of the hot air supplied into the treating chamber is within the above-described range, heat treatment is performed in a state in which an electrostatic adhesive power of the powder particles to be heat-treated is relaxed. Consequently, adhesion between powder particles and adhesion between the powder particles and the apparatus wall surface are thereby reduced so as to suppress melt-adhesion of the toner from occurring.

Adhesion between the powder particles being reduced enables united particles in the toner produced by heat treatment to be reduced and enables the toner having a sharp particle size distribution to be produced. In addition, since adhesion or melt-adhesion of the toner to the apparatus being reduced enables the productivity of the toner to be improved and enables a time period required for stopping and cleaning the apparatus for the purpose of maintenance of the apparatus to be reduced.

If the relative humidity of the hot air is less than 3.0%, since the humidity of the hot air is low, the electrostatic adhesive power of the powder particles to be heat-treated is not able to be reduced, and adhesion between powder particles and adhesion between the powder particles and the apparatus wall surface are not limited to being reduced. If the relative humidity of the hot air is more than 80.0%, condensation tends to occur inside the apparatus, condensation occurs on the apparatus wall surface, and the toner may adhere and grow so as to cause melt-adhesion.

In the present disclosure, an absolute moisture content $(g/m^3)$ in the hot air supplied into the treating chamber is preferably 25.0 $g/m^3$ or more and 2,500.0 $g/m^3$ or less and more preferably 590.0 $g/m^3$ or more and 2,200.0 $g/m^3$ or less.

When the absolute moisture content of the hot air supplied into the treating chamber is within the above-described range, an electrostatic adhesive power of the powder particles to be heat-treated is relaxed, and adhesion between powder particles and adhesion between the powder particles and the apparatus wall surface are reduced so as to suppress melt-adhesion inside the apparatus from occurring.

Further, in the present disclosure, an amount of the hot air supplied into the treating chamber is preferably 20.0 $m^3/min$ or more and 45.0 $m^3/min$ or less and more preferably 30.0 $m^3/min$ or more and 45.0 $m^3/min$ or less.

In the present disclosure, when the amount of the hot air supplied into the treating chamber is within the above-described range, since heat treatment is performed by using the hot air having humidity, an electrostatic adhesive power of the powder particles is relaxed. In addition, shear force is generated due to a hot-air stream in the treating chamber, and the powder particles are heat-treated in a highly dispersed state. Consequently, adhesion between powder particles and adhesion between the powder particles and the apparatus wall surface are reduced so as to suppress melt-adhesion inside the apparatus from occurring.

Further, in the present disclosure, a speed of the conveying air per unit of the plurality of powder-particle supplying units is preferably 3.0 m/s or more and 12.0 m/s or less and more preferably 6.0 m/s or more and 9.0 m/s or less.

In the present disclosure, when the speed of the conveying air is within the above-described range, the powder particles to be heat-treated in the apparatus is highly dispersed due to the shear force of the air stream. The powder particles in a highly dispersed state being mixed with the hot air enable the particles to be prevented from uniting with each other and enable the particles having a high degree of spheronization to be obtained.

Further, in the present disclosure, a relative humidity of the gas flowing in the treating chamber is preferably 95.0% or less and more preferably 90.0% or less. The gas flowing in the treating chamber is a gas mixture of all gases flowing in the chamber, such as the hot air, the cold air, and the conveying air, which are introduced into the cylindrical treating chamber, and secondary air and the like, which are taken into the treating chamber with the conveying air. The relative humidity of the gas flowing in the treating chamber is measured using a hygrometer disposed in a recovery unit 6 on a lower edge portion of the treating chamber in FIG. 2 and FIG. 3. The relative humidity of the gas flowing in the treating chamber being within the above-described range prevents condensation in the apparatus from occurring and reduces melt-adhesion of the powder particles inside the apparatus.

The heat-treated powder particles are cooled by cold air supplied from a cold-air supplying unit 4. The temperature (° C.) of the cold air supplied from the cold-air supplying unit 4 can be −20° C. or higher and 30° C. or lower. The temperature of the cold air being within the above-described range enables the powder particles to be efficiently cooled and enables the powder particles to be prevented from melt-adhering or uniting without impairing uniform spheronization treatment of the powder particles.

Regarding the powder particles supplied to the treating chamber, the flow thereof is regulated by a regulating unit 5, disposed in the treating chamber, for regulating the flow of the powder particles. Consequently, the powder particles supplied to the treating chamber are heat-treated and, thereafter, cooled while circulating in the treating chamber.

The cooled powder particles are recovered by the recovery unit 6 on a lower edge portion of the treating chamber. In this regard, a blower (not illustrated in the drawing) is disposed downstream of the recovery unit, and the blower is configured to suction and convey the powder particles.

The regulating unit 5 for regulating the flow of the powder particles used in the heat-treating apparatus is a columnar member having a circular cross section and is disposed on a central axis of the treating chamber so as to protrude from the lower edge portion of the treating chamber toward the upper edge portion. Since the regulating unit 5 for regulating the flow of the powder particles is disposed on the central axis of the treating chamber, the powder particles supplied to the treating chamber flow in the cylindrical treating chamber while circulating.

The columnar member is provided with, at the central portion of the upper edge portion, a substantially cone-shaped distributing member 7 for distributing the supplied hot air in the circumferential direction. The columnar member is further provided with a circulating member 8 having blades 9 for spirally circulating the distributed hot air in the treating chamber as illustrated in FIG. 4.

When the hot-air supplying portion of the heat-treating apparatus has such a configuration, the hot air supplied from the hot-air supplying unit flows in the cylindrical treating chamber while uniformly circulating.

Consequently, the powder particles supplied into the treating chamber are heat-treated while receiving a centrifugal force due to a circulating flow. As a result, collisions between powder particles are reduced, and united particles of the powder particles during heat treatment are reduced.

To prevent the powder particles from melt-adhering, the columnar member can include a cooling jacket. Further, cooling water (favorably an antifreeze such as ethylene glycol) can be introduced into the cooling jacket, and the surface temperature of the cooling jacket can be 40° C. or lower.

A powder-particle supplying unit 2 of the heat-treating apparatus is disposed so that the circulation direction of the supplied powder particles and the circulation direction of the hot air are the same direction.

Since the circulation direction of the powder particles supplied to the treating chamber is the same as the circulation direction of the hot air having humidity, a turbulent flow does not occur in the treating chamber. Consequently, collisions between powder particles are reduced, an electrostatic adhesive power of the powder particles is relaxed, and the humidity is uniformly delivered from the hot air to the powder particles during heat treatment so that united particles and adhesion inside the apparatus are reduced, and melt-adhesion inside the apparatus is reduced.

The recovery unit 6 of the heat-treating apparatus is disposed on the outer peripheral portion of the treating chamber so as to maintain the circulation direction of the circulated powder particles. Consequently, the circulating flow in the apparatus is maintained, the centrifugal force applied to the powder particles is maintained, and adhesion and melt-adhesion to the regulating unit 5 for regulating the flow of the powder particles are reduced. Further, when this configuration is adopted, since introduced hot air, cold air, conveying air, and the like are mixed in the recovery unit portion, constant humidity is maintained.

A plurality of cold-air supplying units 4 of the heat-treating apparatus can be disposed on the outer peripheral portion of the treating chamber (4-1 to 4-3 in FIG. 3) so that the cold air supplied from the cold-air supplying unit is supplied along the inner peripheral surface of the treating chamber in the same direction as the circulation direction of the hot air.

The heat-treating apparatus has a configuration in which the cold air supplied from the cold-air supplying unit is supplied from the apparatus outer peripheral portion to the treating chamber inner peripheral surface in the horizontal and tangential direction so that the powder particles are prevented from adhering to the treating chamber wall surface.

The circulation direction of the cold air supplied from the cold-air supplying unit being the same direction as the circulation direction of the hot air enables the powder particles to be prevented from uniting with each other since a turbulent flow does not occur in the treating chamber.

The cold air that is supplied can be split into a plurality of parts and introduced on a horizontal cross section of the apparatus basis and optionally can be split into eight parts and introduced. This intends to facilitate uniform control of the air stream in the apparatus, and the amounts of the cold air in eight-part split introduction paths are independently controllable. Consequently, the circulating flow in the apparatus is further enhanced, strong centrifugal force is applied to the powder particles, and the dispersibility of the powder particles is improved.

A plurality of powder-particle supplying units 2 of the heat-treating apparatus can be disposed in the same circumferential direction so that the supplied powder particles are supplied along the inner peripheral surface of the treating chamber.

The heat-treating apparatus has a configuration in which the powder particles supplied from the powder-particle supplying unit 2 are supplied from the apparatus outer peripheral portion to the treating chamber inner peripheral surface in the horizontal and tangential direction. Consequently, strong centrifugal force is applied to the powder particles supplied into the treating chamber, and the dispersibility of the powder particles is improved.

In the heat-treating apparatus, all the circulation directions of the powder particles supplied from the powder-particle supplying unit, the circulation direction of the cold layer supplied from the cold-air supplying unit, and the circulation direction of the hot air having the humidity supplied from the hot-air supplying unit are the same direction. Consequently, a turbulent flow does not occur in the treating chamber, the circulating flow in the apparatus is enhanced, strong centrifugal force is applied to the powder particles, and, simultaneously, the humidity is uniformly delivered from the hot air to the powder particles. As a result, an electrostatic adhesive power of the powder particles is relaxed, the dispersibility of the powder particles is further improved, and a toner including reduced united particles is obtained. In addition, since a turbulent flow does not occur in the apparatus, adhesion of the powder particles to the apparatus inner wall is reduced, and melt-adhesion inside the apparatus is also reduced.

Further, in the heat-treating apparatus, a plurality of powder-particle supplying units 2 are disposed in the same circumferential direction. As illustrated in FIG. 5, as the number of split of the powder-particle supplying unit increases, the powder particles immediately after being introduced into the treating chamber are subjected to heat treatment in the state in which a dust concentration is reduced. The humidity delivered from the hot air to the powder particles becomes uniform with increased number of split of the supplying unit. That is, as the number of the powder-particle supplying unit increases, an electrostatic adhesive power is relaxed, and uniting and melt-adhesion are suppressed from occurring.

Next, the procedure of producing a toner by using the heat-treating apparatus will be described.

In a raw-material mixing step, predetermined amounts of at least a resin and a coloring agent serving as toner raw materials are weighed and combined, and mixing is performed. Examples of the mixing apparatus include Henschel mixer (produced by NIPPON COKE & ENGINEERING CO., LTD.); SUPER MIXER (produced by KAWATA MFG. CO., LTD.); RIBOCONE (produced by OKAWARA MFG. CO., LTD.); NAUTA MIXER, TURBULIZER, and Cyclomix (produced by Hosokawa Micron Corporation); Spiral Pin Mixer (produced by Pacific Machinery & Engineering Co., Ltd.); and Loedige Mixer (produced by Matsubo Corporation).

The mixed toner raw materials are melt-kneaded in a melt-kneading step so as to melt the resins and disperse the coloring agent in the resin. Examples of the kneading apparatus include TEM Extruder (produced by TOSHIBA MACHINE CO., LTD.); TEX Twin Screw Extruder (Japan Steel Works, Ltd.); PCM Kneader (produced by Ikegai Machinery Co.); and KNEADEX (produced by NIPPON COKE & ENGINEERING CO., LTD.), and from the viewpoint of superiority of capability to continuously produce and the like, continuous kneaders such as a single or twin screw kneader rather than a batch type kneader can be adopted.

Further, a colored resin composition obtained by melt-kneading the toner raw materials is rolled using a two-roll mill or the like after melt-kneading and is cooled through a cooling step of performing cooling by water cooling or the like.

A cooled product of the colored resin composition obtained above is pulverized to a predetermined particle diameter in a pulverization step thereafter. In the pulverization step, first, rough pulverization is performed using a crasher, a hammer mill, a feather mill, or the like, and, fine pulverization is further performed using Kryptron System (produced by Kawasaki Heavy Industries Ltd.), Super Rotor (produced by NISSHIN ENGINEERING INC.), or the like so as to obtain toner fine particles.

The resulting toner fine particles are classified into toner powder particles having a predetermined particle diameter in a classification step. Examples of the classifier include Turboplex, FACULTY, TSP Separator, and TTSP Separator (produced by Hosokawa Micron Corporation); and Elbow Jet (produced by Nittetsu Mining Co., Ltd.).

Subsequently, the resulting toner powder particles are subjected to spheronization treatment by using a heat-treating apparatus in a heat treatment step.

In this regard, before the heat treatment step, inorganic fine particles and the like may be added to the resulting toner powder particles, as the situation demands. In a method for adding the inorganic fine particles and the like to the toner powder particles, predetermined amounts of the toner powder particles and various known external additives are combined, and agitation and mixing are performed using a high-speed agitator such as Henschel Mixer, MECHANO HYBRID (NIPPON COKE & ENGINEERING CO., LTD.), Super Mixer, NOBILTA (produced by Hosokawa Micron Corporation), or the like, which applies shear force to the powder, as an external addition machine.

The inorganic fine powder being added to the toner powder particles before the heat treatment step imparts fluidity to the toner powder particles, enables the toner powder particles introduced into the treating chamber to be more uniformly dispersed and to come into contact with the hot air, and enables a toner having excellent uniformity to be obtained.

When a coarse particle is present after heat treatment, as the situation demands, a step of removing the coarse particle through classification may be included. Examples of the classifier for removing the coarse particle include Turboplex, TSP Separator, and TTSP Separator (produced by Hosokawa Micron Corporation); and Elbow Jet (produced by Nittetsu Mining Co., Ltd.).

Further, after the heat treatment, as the situation demands, to screen a coarse particle and the like, for example, screeners such as ULTRASONIC (produced by KOEI SANGYO CO., LTD.); Resonasieve and Gyro-Shifter (produced by TOKUJU CORPORATION); Turbo Screener (produced by Turbo Kogyo Co., Ltd.); Hi-BOLTER (produced by Toyo Hitec Co., Ltd.), and the like may be used.

The heat treatment step may be performed after the above-described fine pulverization or after the classification.

Next, toner constituent materials will be described.

Binder Resin

Common resins may be used as a binder resin used for a toner, and examples include polyesters, styrene-acrylic acid copolymers, polyolefin-based resins, vinyl-based resins, fluorine resins, phenol resins, silicone resins, and epoxy resins. Of these, amorphous polyesters can be used from the viewpoint of providing favorable low-temperature fixability, and a low-molecular-weight polyester and a high-molecular-weight polyester may be used in combination from the viewpoint of ensuring compatibility between low-temperature flexibility and hot-offset resistance. In this regard, a crystalline polyester may be used as a plasticizer from the viewpoint of blocking resistance during storage and a further improvement in low-temperature flexibility.

Release Agent

Examples of the release agent used for the toner include the following.

Low-molecular-weight polyolefins, silicone waxes, fatty acid amides, ester waxes, carnauba waxes, hydrocarbon-based waxes, and the like are included. The release agents may be used alone, or at least two types may be used in combination.

When a binder resin used for producing a toner particle is synthesized, the release agent may be mixed with raw materials for synthesis of the binder resin or may be added in a raw-material mixing step during production of the toner.

The release agent content in the toner can be 1 part by mass or more and 20 parts by mass or less relative to 100 parts by mass of the binder resin.

Inorganic Fine Particles

As described above, the inorganic fine particles can be added to the toner particle before the heat treatment step. The inorganic fine particles serving as an external additive are mixed with the toner particles before heat treatment. The inorganic fine particles can be fine particles of silica, titanium oxide, aluminum oxide, or strontium titanate. The inorganic fine particles can be hydrophobized using a hydrophobization agent such as a silane compound, a silicone oil, or a mixture of these.

The number average particle diameter of the inorganic fine particles can be 10 nm or more and 300 nm or less. To ensure compatibility between stabilization of durability and an improvement in fluidity, a plurality of types of inorganic fine particles having a number average particle diameter within the above-described range may be used in combination.

The inorganic fine particle content can be 0.01 parts by mass or more and 10.0 parts by mass or less relative to 100 parts by mass of the toner particle.

Coloring Agent

Examples of the coloring agent used for the toner include the following.

That is, examples of the coloring agent include known organic pigments or oil-based dyes, carbon black, and magnetic materials.

Examples of the cyan-based coloring agent include copper phthalocyanine compounds or derivatives thereof, anthraquinone compounds, and basic dye lake compounds.

Examples of the magenta-based coloring agent include condensed azo compounds, diketopyrrolopyrrole compounds, anthraquinone compounds, quinacridone compounds, basic dye lake compounds, naphthol compounds, benzimidazolone compounds, thioindigo compounds, and perylene compounds.

Examples of the yellow-based coloring agent include condensed azo compounds, isoindolinone compounds, anthraquinone compounds, azo metal complexes, methine compounds, and allylamide compounds.

Examples of black-based coloring agent include carbon black, magnetic materials, and materials color-matched with black by using the yellow-based coloring agent, the magenta-based coloring agent, and the cyan-based coloring agent.

The coloring agents may be used alone, or at least two types may be used in combination.

Next, methods for measuring various physical properties of the toner particles will be described below.

Method for Measuring Weight Average Molecular Weight (D4) of Toner Particles

The weight average molecular weight (D4) of the toner particles may be calculated on the basis of the measurement performed with the number of effective measuring channels of 25,000 and the analysis of the measurement data by using an apparatus and software described below.

An accurate particle size distribution analyzer "Coulter Counter Multisizer 3" (registered trademark, produced by Beckman Coulter, Inc.) provided with a 50-μm aperture tube based on an aperture impedance method Dedicated software "Beckman Coulter Multisizer 3 Version 3.51" (produced by Beckman Coulter, Inc.), attached to the above-described apparatus, for setting the measurement conditions and analyzing measurement data

Regarding an electrolytic aqueous solution used for the measurement, a solution in which analytical grade sodium chloride is dissolved into deionized water so as to have a concentration of about 1% by mass, for example, "ISOTON II" (produced by Beckman Coulter, Inc.) may be used.

Before the measurement and the analysis are performed, the dedicated software is set as described below.

In a "Changing standard operation method (SOM)" screen of the dedicated software, the total count number in the control mode is set to be 50,000 particles, the number of measurements is set to be 1, and a Kd value is set to be a value obtained by using "Standard particles 10.0 μm" (produced by Beckman Coulter, Inc.). A threshold value and a noise level are automatically set by pushing a "Threshold value/noise level measurement button". In addition, Current is set to be 1,600 μA, Gain is set to be 2, Electrolytic solution is set to be ISOTON II, and "Flush of aperture tube after measurement" is checked.

In a "Setting conversion from pulse to particle diameter" screen of the dedicated software, Bin interval is set to be logarithmic particle diameter, Particle diameter bin is set to be 256 particle diameter bin, and Particle diameter range is set to be 1 μm or more and 30 μm or less.

Specific measuring method is as described below.

(1) A 250 mL round-bottom glass beaker dedicated to "Multisizer 3" is charged with about 200 mL of the electrolytic aqueous solution, the beaker is set into a sample stand, and counterclockwise agitation with a stirrer rod is performed at 24 rotations/sec. Subsequently, contamination and air bubbles in the aperture tube are removed by a "Flush of aperture tube" function of the dedicated software.

(2) A 100 mL flat-bottom glass beaker is charged with about 30 mL of the electrolytic aqueous solution. To the beaker, about 0.3 mL of diluted liquid prepared by diluting a dispersing agent "Contaminon N" (10% by mass aqueous solution of neutral detergent for precision measurement appliance cleaning which includes a nonionic surfactant, an anionic surfactant, and an organic builder and which has a pH of 7, produced by Wako Pure Chemical Industries, Ltd.) with deionized water by a factor of 3 on a mass basis is added.

(3) An ultrasonic dispersion device "Ultrasonic Dispersion System Tetora 150" (produced by Nikkaki Bios Co., Ltd.) that includes two oscillators having an oscillation frequency of 50 kHz, with their phases shifted by 180 degrees from each other, and that has an electrical output of 120 W is prepared. A water tank provided with the ultrasonic dispersion device is charged with a predetermined amount of deionized water, and about 2 mL of Contaminon N above is added to the water tank.

(4) The beaker according to (2) above is set into a beaker fixing hole of the ultrasonic dispersion device, and ultrasonic dispersion device is operated. Subsequently, the height position of the beaker is adjusted so that the resonance state of the liquid surface of the electrolytic aqueous solution in the beaker becomes at a maximum level.

(5) In the state in which the electrolytic aqueous solution in the beaker according to (4) above is irradiated with ultrasonic waves, about 10 mg of toner is added gradually to the electrolytic aqueous solution and dispersed. Subsequently, the ultrasonic dispersion treatment is continued for further 60 sec. In this regard, during the ultrasonic dispersion, the water temperature of the water tank is appropriately adjusted to become 10° C. or higher and 40° C. or lower.

(6) The electrolytic aqueous solution, according to (5) above, containing dispersed toner particles is dripped to the round-bottom beaker, according to (1) above, set into the sample stand by using a pipette so that the measured concentration is adjusted to about 5%. Subsequently, the measurement is performed until the number of measured particles reaches 50,000.

(7) The weight average particle diameter (D4) is calculated by analyzing the measurement data with the dedicated software attached to the apparatus. In this regard, an "Average diameter" on an "Analysis/volume statistical value (arithmetic mean)" screen, where graph/volume % is set in the dedicated software, corresponds to the weight average particle diameter (D4).

Method for Measuring Average Circularity

The average circularity of the toner particles may be measured with a flow particle image analyzer "FPIA-3000" (produced by SYSMEX CORPORATION) under the measurement and analysis condition of the calibration operation.

The specific measuring method is as described below.

About 20 mL of deionized water, from which impurity solids and the like have been removed in advance, is placed into a glass container. About 0.2 mL of diluted liquid prepared by diluting a dispersing agent "Contaminon N" (10% by mass aqueous solution of neutral detergent for precision measurement appliance cleaning which includes a nonionic surfactant, an anionic surfactant, and an organic builder and which has a pH of 7, produced by Wako Pure Chemical Industries, Ltd.) with deionized water by a factor of 3 on a mass basis is added thereto.

Further, about 0.02 g of measurement sample is added, and a dispersion treatment is performed for 2 minutes by using an ultrasonic dispersion device so as to prepare a dispersion liquid for the measurement. In such an instance, cooling is appropriately performed so that the temperature of the dispersion liquid becomes 10° C. or higher and 40° C. or lower. Regarding the ultrasonic dispersion device, a table top ultrasonic cleaner dispersion device ("VS-150" (produced by VELVO-CLEAR)) having an oscillation frequency of 50 kHz and an electrical output of 150 W is used. A predetermined amount of deionized water is placed into a water tank. About 2 mL of Contaminon N above is added to the water tank.

In the measurement, the above-described flow particle image analyzer incorporated with a standard objective lens (magnification of 10 times) is used, and a particle sheath "PSE-900A" (produced by SYSMEX CORPORATION) is used as a sheath liquid. The dispersion liquid prepared in the above-described procedure is introduced into the above-described flow particle image analyzer, and 3,000 toner particles are measured in a total counter mode of the HPF measurement mode. The average circularity of the toner particles is determined, where the binarization threshold value in particle analysis is specified to be 85% and the analysis particle diameter is limited to 1.985 μm or more and less than 39.69 μm on an equivalent circle diameter basis.

In the measurement, automatic focusing is performed before start of the measurement by using standard latex particles. Regarding the standard latex particles, standard latex particles ("RESEARCH AND TEST PARTICLES Latex Microsphere Suspensions 5200A" produced by Duke Scientific Corporation are diluted with deionized water) are used. Thereafter, focusing can be performed every 2 hours from start of the measurement.

In the example according to the present disclosure, the flow particle image analyzer subjected to calibration operation by SYSMEX CORPORATION was used, where a calibration certificate was issued. The measurement was performed under the measurement and analysis condition on the basis of the calibration certificate except that the analysis particle diameter was limited to 1.985 μm or more and less than 39.69 μm on an equivalent circle diameter basis.

Measurement of Glass Transition Temperature (Tg) of Toner

The glass transition temperature is measured in conformity with ASTM D3418-82 by using a differential scanning calorimeter "Q2000 (produced by TA Instruments)". The temperature calibration of the detection unit of the apparatus uses the melting points of indium and zinc, and calibration of the heat quantity uses the heat of fusion of indium.

Specifically, about 3 mg of resin or toner particles are precisely weighed and are placed into an aluminum pan, an empty aluminum pan is used for reference, and measurement is performed under the following conditions.

Temperature rise rate: 10° C./min

Measurement start temperature: 30° C.

Measurement completion temperature: 180° C.

The measurement temperature range is set to be 30° C. to 180° C., and the measurement is performed at a temperature rise rate of 10° C./min. The temperature is once raised to 180° C., maintained for 10 min, and decreased to 30° C. Thereafter, the temperature is raised again. A change of specific heat is obtained in the temperature range of 30° C. to 100° C. during the second temperature rise. In this regard, an intersection point of a line passing through the midpoint of the base lines before and after an occurrence of change in the specific heat and the differential thermal curve is taken as the glass transition temperature (Tg).

EXAMPLES

The present disclosure will be more specifically described below with reference to examples according to the present disclosure and comparative examples. However, the present disclosure is not limited to these examples. In the examples below, "part" is on a mass basis, unless otherwise specified.

Production Example of Amorphous Polyester L

Polyoxypropylene(2,2)-2,2-bis(4-hydroxyphenyl)pro-
pane: 72.0 parts (0.200 parts in a mole fraction; 100.0% by mole relative to a total number of moles of poly-hydric alcohols)

Terephthalic acid: 28.0 parts (0.169 parts in a mole fraction; 96.0% by mole relative to a total number of moles of polyvalent carboxylic acids)

Tin 2-ethylhexanoate (esterification catalyst): 0.5 parts

The above-described materials were weighed into a reaction vessel provided with a cooling tube, an agitator, a nitrogen introduction tube, and a thermocouple. After the interior of the reaction vessel was replaced with a nitrogen gas, the temperature was gradually raised under agitation, and a reaction was performed for 4 hours at a temperature of 200° C. under agitation.

The pressure in the reaction vessel was decreased to 8.3 kPa and maintained for 1 hour. Thereafter, cooling to 180° C. was performed, and the pressure was returned to atmospheric pressure.

Trimellitic anhydride: 1.3 parts (0.007 parts in a mole fraction; 4.0% by mole relative to a total number of moles of polyvalent carboxylic acids)

tert-butylcatechol (polymerization inhibitor): 0.1 parts

Subsequently, the above-described materials were added, the pressure in the reaction vessel was decreased to 8.3 kPa, a reaction was performed for 1 hour while the temperature was maintained at 180° C., and the reaction was stopped by decreasing the temperature after checking that the softening temperature measured in conformity with ASTM D36-86 reached 90° C. so as to obtain Amorphous polyester L.

Production Example of Amorphous Polyester H

Polyoxypropylene(2,2)-2,2-bis(4-hydroxyphenyl)pro-
pane: 72.3 parts (0.200 parts in a mole fraction; 100.0% by mole relative to a total number of moles of poly-hydric alcohols)

Terephthalic acid: 18.3 parts (0.110 parts in a mole fraction; 65.0% by mole relative to a total number of moles of polyvalent carboxylic acids)

Fumaric acid: 2.9 parts (0.025 parts in a mole fraction; 15.0% by mole relative to a total number of moles of polyvalent carboxylic acids)

Tin 2-ethylhexanoate (esterification catalyst): 0.5 parts

The above-described materials were weighed into a reaction vessel provided with a cooling tube, an agitator, a nitrogen introduction tube, and a thermocouple. After the interior of the reaction vessel was replaced with a nitrogen gas, the temperature was gradually raised under agitation, and a reaction was performed for 2 hours at a temperature of 200° C. under agitation.

The pressure in the reaction vessel was decreased to 8.3 kPa and maintained for 1 hour. Thereafter, cooling to 180° C. was performed, and the pressure was returned to atmospheric pressure.

Trimellitic anhydride: 6.5 parts (0.034 parts in a mole fraction; 20.0% by mole relative to a total number of moles of polyvalent carboxylic acids)

tert-Butylcatechol (polymerization inhibitor): 0.1 parts

Subsequently, the above-described materials were added, the pressure in the reaction vessel was decreased to 8.3 kPa, a reaction was performed for 15 hours while the temperature was maintained at 180° C., and the reaction was stopped by decreasing the temperature after checking that the softening temperature measured in conformity with ASTM D36-86 reached 137° C. so as to obtain Amorphous polyester H.

Crystalline Polyester 1,6-Hexanediol: 34.5 parts (0.29 parts in a mole fraction; 100.0% by mole relative to a total number of moles of polyhydric alcohols)

Dodecanedioic acid: 65.5 parts (0.28 parts in a mole fraction; 100.0% by mole relative to a total number of moles of polyvalent carboxylic acids)

Tin 2-ethylhexanoate: 0.5 parts

The above-described materials were weighed into a reaction vessel provided with a cooling tube, an agitator, a nitrogen introduction tube, and a thermocouple. After the interior of the reaction vessel was replaced with a nitrogen gas, the temperature was gradually raised under agitation, and a reaction was performed for 3 hours at a temperature of 140° C. under agitation.

The pressure in the reaction vessel was decreased to 8.3 kPa, and the reaction was performed 4 hours while the temperature of 140° C. was maintained.

The pressure in the reaction vessel was gradually released and returned to atmospheric pressure. Thereafter, 7.0% by mole of stearic acid was added relative to 100.0% by mole of the raw material monomer, and a reaction was performed at atmospheric pressure and 200° C. for 2 hours.

Subsequently, the pressure in the reaction vessel was decreased again to 5 kPa or less, and the reaction was performed at 200° C. for 3 hours so as to obtain a crystalline polyester.

Production Example of Toner Powder Particles

Amorphous polyester L: 70 parts

Amorphous polyester H: 30 parts

15

Crystalline polyester: 5 parts

Fischer-Tropsch wax (peak temperature of maximum endothermic peak of 90° C.): 6 parts C.I. Pigment Blue 15:3:7 parts After the materials of the above-described combination were mixed using a Henschel mixer Model FM-75 (produced by NIPPON COKE & ENGINEERING CO., LTD.), kneading was performed using a twin screw kneader Model PCM-30 (produced by Ikegai Machinery Co.) at a temperature set to be 120° C. The resulting kneaded material was cooled and coarsely pulverized to 1 mm or less by using a hammer mill so as to be made into a toner coarsely pulverized material. The resulting toner coarsely pulverized material was pulverized using a mechanical pulverizer T-250 (produced by Turbo Kogyo Co., Ltd.) so as to obtain toner fine particles. The resulting toner fine particles were classified using FACULTY (produced by Hosokawa Micron Corporation).

In such an instance, the resulting toner powder particles had a glass transition temperature of 58° C., a weight average particle diameter (D4) of 5.73 μm, and an average circularity of 0.952.

Hereafter, this is denoted as Toner powder particles A1.

Further, the following materials were placed into a Henschel mixer (Model FM-75, produced by NIPPON COKE & ENGINEERING CO., LTD.), and mixing was performed at a peripheral speed of the rotary blade of 50.0 m/sec for a mixing time of 3 min so as to obtain Toner powder particles B1 in which silica and strontium titanate adhered to the surface of Toner powder particles A1.

Toner powder particles A1: 100 parts

Silica fine particles (number average particle diameter of 100 nm): 3 parts

Strontium titanate (number average particle diameter of 30 nm): 0.5 parts

Example 1

In the present example, the humidity-adjusting unit was connected to the hot-air supplying unit, and Toner powder particles B1 was heat-treated using the heat-treating apparatus illustrated in FIG. 2 and FIG. 3 and the circulating member illustrated in FIG. 4, wherein the raw-material supplying unit was split into eight parts as illustrated in FIG. 5, under the following operation conditions.

Amount of Toner powder particles B1 supplied: 200 kg/hr

Hot-air temperature: 160.0° C.

Amount of hot air: 35.0 m³/min

Hot-air relative humidity: 67.3%

Hot-air absolute moisture content: 2085.0 g/m³

Speed of conveying air per powder-particle supplying unit: 8.0 m/s

Relative humidity of gas flowing in heat-treating apparatus: 90%

Regarding other operation conditions, the cold-air temperature was −5° C., and 6.0 m³/min of each of the first stage cold air and the second stage cold air was split into eight parts so that 0.75 m³/min per part of cold air was supplied into the treating chamber. Further, 4.2 m³/min of the third stage cold air was split into three parts so that 1.4 m³/min per part of cold air was supplied into the treating chamber.

The resulting heat-treated particles had a weight average particle diameter (D4) of 5.73 μm and an average circularity of 0.968.

In this regard, the cohesiveness of the resulting heat-treated particles was evaluated as described below.

Evaluation of Cohesiveness of Heat-Treated Particles

A difference between the weight average particle diameter of the resulting heat-treated particles and the weight average particle diameter of Toner powder particles B1 before heat treatment (ΔD4=weight average particle diameter of heat-treated particles−weight average particle diameter of Toner powder particles B1) was calculated and evaluated in accordance with the following criteria.

A: ΔD4<0.10

B: 0.10≤ΔD4<0.20

C: 0.20≤ΔD4<0.30

D: 0.30≤ΔD4

Further, after the operation was performed for 1 hour under the same conditions, melt-adhesion inside the apparatus was examined as described below and evaluated.

Evaluation of Melt-Adhesion Inside Apparatus

A scope portion of an industrial video scope "IPLEX NX" (produced by Olympus Corporation) was inserted from an inspection hole (not illustrated in the drawing) in the side surface of the heat-treating apparatus, a state of melt-adhesion in the apparatus was examined, and assessment was performed in accordance with the following criteria.

A: a level in which no melt-adhesion is observed

B: a level in which melt-adhesion is slightly observed, but there is no problem in the operation C: a level in which melt-adhesion is observed, but there is no problem in the operation D: a level in which melt-adhesion is observed, and the operation has to be stopped for cleaning The results of the above-described evaluation are presented in Table 2.

Examples 2 to 23 and Comparative Examples 1 to 5

Toner powder particles B1 were heat-treated in a manner akin to that in example 1 except that the operation conditions of the heat-treating apparatus were changed to conditions presented in Table 1. Further, the weight average particle diameter and the average circularity of the resulting heat-treated particles were measured and evaluated in a manner akin to that in Example 1. The results are presented in Table 2.

Comparative Example 6

Toner powder particles B1 were heat-treated in a manner akin to that in example 1 except that the humidity-adjusting unit was not connected to the hot-air supplying unit and that the operation conditions of the heat-treating apparatus were changed to conditions presented in Table 1. Further, the weight average particle diameter and the average circularity of the resulting heat-treated particles were measured and evaluated. The results are presented in Table 2.

TABLE 1

| Example/ Comparative example | Hot-air relative humidity (%) | Hot-air temperature (° C.) | Hot-air absolute moisture content (g/m³) | Amount of hot air (m³/min) | Speed of conveying air per powder-particle supplying unit (m/s) | Relative humidity of gas flowing in heat-treating apparatus (%) |
|---|---|---|---|---|---|---|
| Example 1 | 67.3 | 160.0 | 2085.0 | 35.0 | 8.0 | 90 |
| Example 2 | 60.0 | 165.0 | 2085.0 | 35.0 | 8.0 | 95 |
| Example 3 | 53.7 | 170.0 | 2085.0 | 35.0 | 8.0 | 98 |
| Example 4 | 53.7 | 170.0 | 2085.0 | 35.0 | 3.0 | 98 |
| Example 5 | 53.7 | 170.0 | 2085.0 | 35.0 | 12.0 | 98 |
| Example 6 | 53.7 | 170.0 | 2085.0 | 35.0 | 15.0 | 98 |
| Example 7 | 53.7 | 170.0 | 2085.0 | 35.0 | 2.0 | 98 |
| Example 8 | 53.7 | 170.0 | 2085.0 | 45.0 | 2.0 | 98 |
| Example 9 | 53.7 | 170.0 | 2085.0 | 20.0 | 2.0 | 98 |
| Example 10 | 53.7 | 170.0 | 2085.0 | 48.0 | 2.0 | 98 |
| Example 11 | 53.7 | 170.0 | 2085.0 | 15.0 | 2.0 | 98 |
| Example 12 | 4.1 | 101.0 | 25.0 | 15.0 | 2.0 | 98 |
| Example 13 | 46.9 | 185.0 | 2500.0 | 15.0 | 2.0 | 98 |
| Example 14 | 4.1 | 100.5 | 24.5 | 15.0 | 2.0 | 98 |
| Example 15 | 42.8 | 190.0 | 2520.0 | 15.0 | 2.0 | 98 |
| Example 16 | 4.0 | 100.5 | 24.0 | 15.0 | 2.0 | 98 |
| Example 17 | 75.0 | 163.5 | 2520.0 | 15.0 | 2.0 | 98 |
| Example 18 | 3.8 | 102.0 | 24.0 | 15.0 | 2.0 | 98 |
| Example 19 | 77.6 | 162.0 | 2520.0 | 15.0 | 2.0 | 98 |
| Example 20 | 78.0 | 200.0 | 5568.2 | 15.0 | 2.0 | 98 |
| Example 21 | 3.8 | 100.0 | 22.4 | 15.0 | 2.0 | 98 |
| Example 22 | 80.0 | 200.0 | 5711.0 | 15.0 | 2.0 | 98 |
| Example 23 | 3.0 | 100.0 | 17.7 | 15.0 | 2.0 | 98 |
| Comparative example 1 | 3.8 | 95.0 | 18.9 | 15.0 | 2.0 | 98 |
| Comparative example 2 | 78.0 | 205.0 | 6110.2 | 15.0 | 2.0 | 98 |
| Comparative example 3 | 2.5 | 160.0 | 77.5 | 15.0 | 2.0 | 98 |
| Comparative example 4 | 85.0 | 160.0 | 2634.4 | 15.0 | 2.0 | 98 |
| Comparative example 5 | 85.0 | 205.0 | 6658.5 | 15.0 | 2.0 | 98 |
| Comparative example 6 | 2.5 | 95.0 | 12.5 | 15.0 | 2.0 | 98 |

TABLE 2

| Example/ Comparative example | D4 after heat treatment (µm) | ΔD4 (µm) | average circularity after heat treatment | Evaluation of melt-adhe-sion inside apparatus | Evaluation of cohe-siveness |
|---|---|---|---|---|---|
| Example 1 | 5.73 | 0.00 | 0.968 | A | A |
| Example 2 | 5.75 | 0.02 | 0.968 | A | A |
| Example 3 | 5.77 | 0.04 | 0.969 | A | A |
| Example 4 | 5.79 | 0.06 | 0.969 | A | A |
| Example 5 | 5.80 | 0.07 | 0.967 | A | A |
| Example 6 | 5.82 | 0.09 | 0.966 | A | A |
| Example 7 | 5.83 | 0.10 | 0.967 | A | B |
| Example 8 | 5.85 | 0.12 | 0.967 | A | B |
| Example 9 | 5.87 | 0.14 | 0.965 | A | B |
| Example 0 | 5.90 | 0.17 | 0.966 | B | B |
| Example 11 | 5.94 | 0.21 | 0.964 | A | C |
| Example 12 | 5.95 | 0.22 | 0.962 | A | C |
| Example 13 | 5.97 | 0.24 | 0.965 | A | C |
| Example 14 | 5.98 | 0.25 | 0.962 | B | C |
| Example 15 | 5.99 | 0.26 | 0.965 | B | C |
| Example 16 | 6.00 | 0.27 | 0.962 | B | C |
| Example 17 | 6.00 | 0.27 | 0.964 | B | C |
| Example 18 | 6.00 | 0.27 | 0.962 | C | C |
| Example 19 | 6.00 | 0.27 | 0.964 | C | C |
| Example 20 | 6.01 | 0.28 | 0.966 | C | C |
| Example 21 | 6.01 | 0.28 | 0.958 | C | C |
| Example 22 | 6.02 | 0.29 | 0.966 | C | C |
| Example 23 | 6.02 | 0.29 | 0.957 | C | C |
| Comparative example 1 | 6.05 | 0.32 | 0.955 | C | D |
| Comparative example 2 | 6.18 | 0.45 | 0.965 | D | D |

TABLE 2-continued

| Example/ Comparative example | D4 after heat treatment (µm) | ΔD4 (µm) | average circularity after heat treatment | Evaluation of melt-adhe-sion inside apparatus | Evaluation of cohe-siveness |
|---|---|---|---|---|---|
| Comparative example 3 | 6.10 | 0.37 | 0.964 | D | D |
| Comparative example 4 | 6.21 | 0.48 | 0.963 | D | D |
| Comparative example 5 | 6.24 | 0.51 | 0.965 | D | D |
| Comparative example 6 | 6.30 | 0.57 | 0.954 | D | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-192912 filed Nov. 29, 2021, which is hereby incorporated by reference herein in its entirety.

What is claimed is:

1. A method for manufacturing a toner comprising:
   supplying powder particles containing a binder resin via a plurality of powder-particle supplying units to a treating chamber, the treating chamber comprising a cylindrical inner peripheral surface;

heat treating the powder particles in the treating chamber by supplying hot air into the treating chamber, wherein a temperature of the hot air supplied into the treating chamber is 100.0° C. or higher and 200.0° C. or lower; and adjusting a humidity of the hot air so that a relative humidity of the hot air supplied into the treating chamber is 3.0% or more and 80.0% or less.

2. The method for manufacturing a toner according to claim 1, wherein the relative humidity of the hot air supplied into the treating chamber is 4.0% or more and 75.0% or less.

3. The method for manufacturing a toner according to claim 1, wherein an absolute moisture content (g/m$^3$) in the hot air supplied into the treating chamber is 25.0 g/m$^3$ or more and 2,500.0 g/m$^3$ or less.

4. The method for manufacturing a toner according to claim 1, wherein an amount of the hot air supplied into the treating chamber is 20.0 m$^3$/min or more and 45.0 m$^3$/min or less.

5. The method for manufacturing a toner according to claim 1, wherein a speed of the conveying air per unit of the plurality of powder-particle supplying units is 3.0 m/s or more and 12.0 m/s or less.

6. The method for manufacturing a toner according to claim 1, wherein heat treatment in the treating chamber is performed under gas flowing having a relative humidity of 95.0% or less.

* * * * *